Feb. 29, 1944.  I. T. MILLER  2,343,153
HARVESTER
Filed Nov. 9, 1942
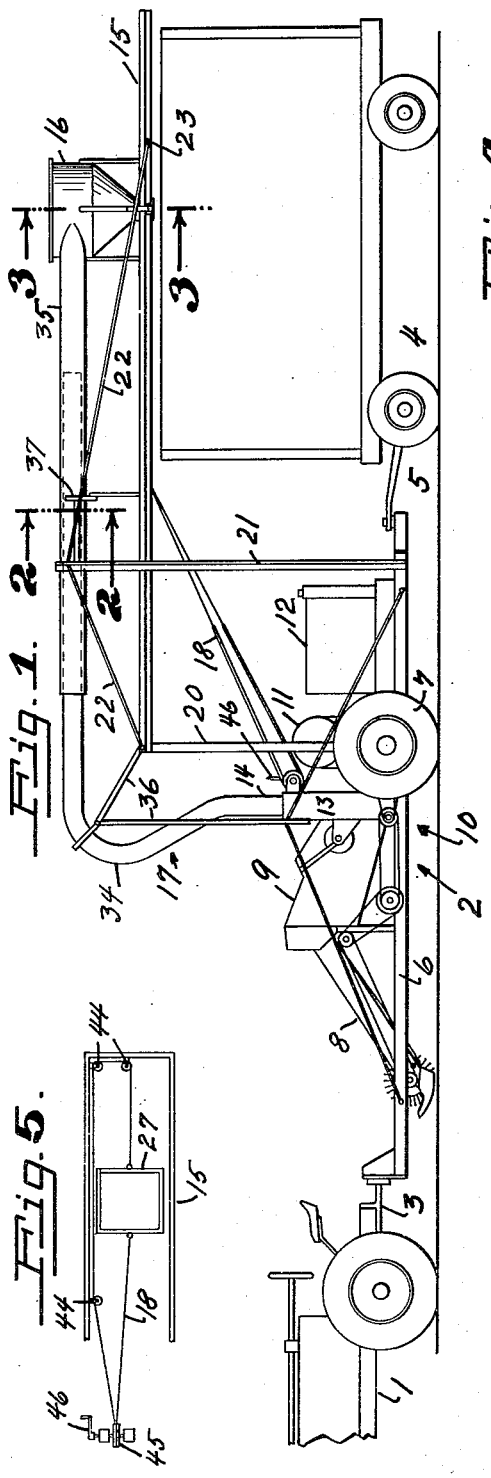
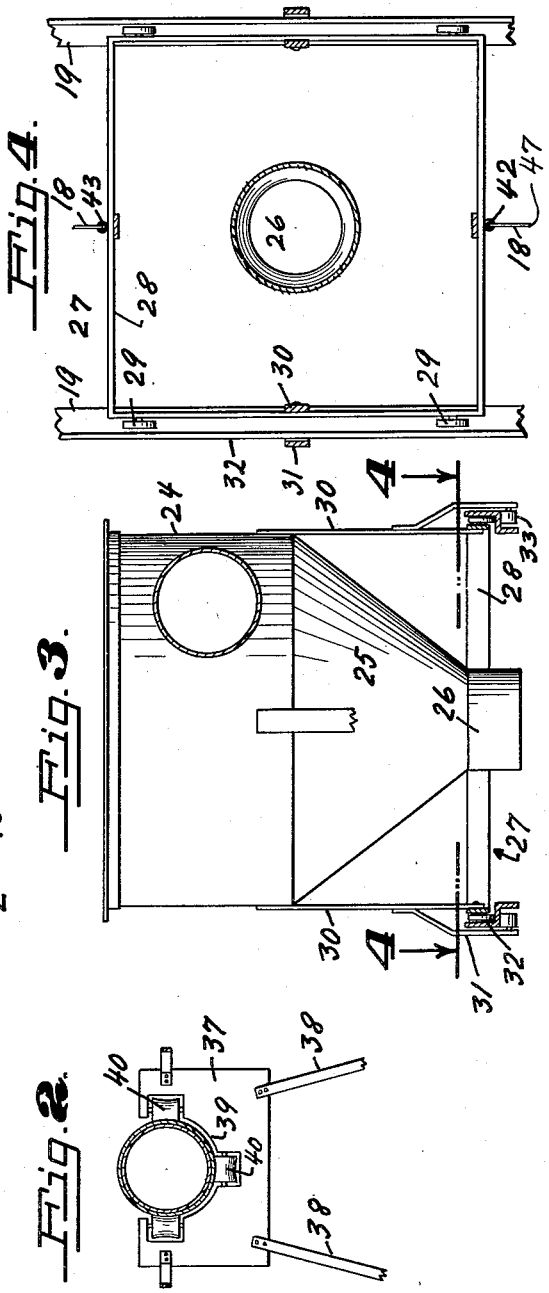
INVENTOR.
IRVEN T. MILLER.
BY
A. Schapp
ATTORNEY.

Patented Feb. 29, 1944

2,343,153

UNITED STATES PATENT OFFICE 2,343,153

HARVESTER

Irven T. Miller, Modesto, Calif.

Application November 9, 1942, Serial No. 465,002

7 Claims. (Cl. 146—107)

The present invention relates to improvements in harvesters, and has particular reference to a portable machine adapted to pick up hay or the like from windrows, to comminute the hay and to discharge the comminuted material into a trailer, bin, or other vehicle.

In machines of this type I have previously used a mill discharging under pressure and a conduit connection between the mill and the trailer whereby the comminuted material was blown into the trailer directly. This method proved unsatisfactory since the discharge into the trailer under the pressure of the mill created considerable dust and it was difficult to secure an even distribution of the material over the trailer, which usually is of substantial size.

In the present invention I propose to provide an improved means for delivering the comminuted material from the mill to the trailer, which includes in its principal features, a track mounted to extend over the trailer, a cyclone dust collector mounted on the track and movable thereon, an extensible conduit connecting the mill discharge with the dust collector and means operable from a remote point for moving the dust collector.

This arrangement separates the air from the comminuted material and causes the latter to be discharged upon the trailer by gravity instead of under mill pressure. It further allows the attendant, stationed at the feed end of the mill, to move the dust collector over the trailer and to thus effect a substantially even distribution of the comminuted material.

While the invention is directed principally to a portable harvester discharging upon a trailer, it is apparent that the same principle may be applied to a stationary harvester or mill discharging into a stationary container or building, or upon any desired area of ground surface, possibly provided with a suitable enclosure.

Other objects and advantages of my invention will appear as the specification proceeds, and the novel features of the same will be fully set forth in the claims hereto attached.

The preferred form of my invention is illustrated in the accompanying drawing, in which:

Figure 1 shows a side elevation of my harvester;

Figure 2, a transverse section taken along line 2—2 of Figure 1;

Figure 3, a transverse section taken along line 3—3 of Figure 1;

Figure 4, a horizontal section taken along line 4—4 of Figure 3; and

Figure 5, a diagrammatic view illustrating a cable arrangement for operating the cyclone dust collector.

While I have shown only the preferred form of my invention, I wish to have it understood that various changes or modifications may be made within the scope of the claims hereto attached, without departing from the spirit of the invention.

Referring to the drawing in detail, Figure 1 shows, in side elevation, the general arrangement of my harvester, which comprises a tractor 1, a mill unit 2 attached thereto, as at 3, and a trailer attached to the mill unit, as at 5. The tractor may be of any suitable form and of conventional type, such as is commonly used for pulling farm machinery, or the harvester may be self-drawn without the use of a tractor, or may be completely mounted on a truck.

The mill unit comprises a frame 6 supported on two or more wheels 7, a pick-up device 8, a feed chute 9, a mill 10, a gas tank 11 and a power plant 12. The pick up may be of any suitable form adapted to pick hay or other vegetable materials from windrows, as the harvester advances, and to feed it to the chute 9 which latter feeds the hay on a downward grade to the mill 10.

The mill may also be of any preferred construction, and is preferably made in accordance with the teachings of the Elderkin Reissue Patent No. 21,523 of August 6, 1940, and of my two patents, No. 2,239,197 of April 22, 1941, and No. 2,248,640 of July 8, 1941. It comprises in its principal features, a housing 13, a central intake opposite the chute and a peripheral outlet, shown at 14. In its inside, it has a cylindrical perforated drum and a rotor inside the drum, the rotor being driven at high speed by the power plant 12.

In operation, the rotor grips the entering hay or other material, and throws it against the drum, the hay being comminuted through impact with the walls of the perforations and the comminuted hay being discharged under great pressure through the discharge 14. All of these features have been fully described and illustrated in the above patents and, therefore, are not shown in the present drawing, except as far as necessary for the understanding of the present invention.

The trailer 4 may be of any conventional form, and preferably is of the box type, of considerable size, and open at the top.

The principal feature of the present invention lies in the means for transferring the comminuted material from the mill to the trailer.

This means comprises a track 15 mounted above the trailer, a cyclone dust collector 16 movable on the track, an extensible conduit 17 connecting the dust collector with the discharge end of the mill, and a cable 18 arranged for operation by an attendant from a remote point, such as a station near the feed end of the mill, for moving the cyclone collector forward or rearward.

The track 15 comprises two rails 19 suitably interconnected to form a unit and supported at one end by a vertical frame 20 rising from the main frame 6 of the mill unit and intermediate its length by a second frame 21 rising from the rear end of the main frame 6.

The second frame extends upward beyond the height of the track and serves as a suspension tower for the cable 22 anchored at one end to the vertical frame 20 and at its other end to the free end of the track, as at 23.

The cyclone dust collector is of conventional type and comprises a cylindrical portion 24, into which the material is tangentially discharged from the conduit 17, a conical portion 25 connecting therewith, and a discharge chute 26 connected with the bottom of the conical portion.

The action of this cyclone dust collector is well understood:

The air with the comminuted material entrained therein is discharged into the cylindrical part at a tangent and whirls around in the latter, whereby the material is thrown outward against the wall and gradually loses its speed due to friction and gravitates toward the bottom, while the air is discharged through the top. The material thus drops from the collector into the trailer under its own weight, and in the absence of a strong air current.

For supporting the cyclone dust collector on the track, I provide a suitable carriage 27 comprising a rectangular frame 28 having four wheels 29 riding on the track. The frame has four uprights 30, between which the cylindrical part of the dust collector is supported, the uprights rising from the centers of the sides and ends of the frame.

The two uprights rising from the sides have outer brackets 31 which straddle outer flanges 32 rising from the rails, and the lower ends of which carry wheels 33 bearing on the bottom faces of the rails for steadying the carriage.

The track, carriage and collector are arranged in such a manner that the lower end of the dust collector just clears the ends of the trailer so as to allow the latter to be readily connected to and disconnected from the mill unit.

The conduit 17 comprises two sections 34 and 35. The section 34 rises from the discharge end of the mill to the plane of the cylindrical part of the dust collector 16 and then turns rearward in a horizontal direction. At its bend it is suitably supported by brackets 36. The section 35 is made to telescope on the front section and connects to the dust collector on a tangent, as previously described.

To give additional support to an intermediate portion of the rear section, I provide a vertically disposed transverse plate 37 supported on rods 38 rising from the track, the plate being recessed in its upper portion, as at 39, to form a bed for the conduit section. Suitable rollers 40 are provided in this bed to give vertical support and lateral guidance to the conduit.

The carriage 27 supporting the dust collector may be moved forward and rearward on the track from a remote point, preferably from the operator's station which usually is located at the feed end of the mill. For this purpose, I provide the cable 18, the ends of which are connected to the front and rear frame members of the carriage, as at 42 and 43, while its intermediate portion is guided over suitably placed sheaves 44 and a drum 45 at the operator's station to allow the attendant to move the carriage in either direction by revolving the drum by means of a crank 46. The drum may be made in the form of a sprocket, in which case a chain 47 is connected into the cable to mesh with the sprocket.

In operation, the comminuted material is carried by the air blast emanating from the mill into the cyclone dust collector where it is separated from the air and made to drop into the trailer by gravity.

For maintaining a substantially even level of the material in the trailer, the operator, from time to time, through operation of the cable, moves the carriage 27 with the dust collector, backward or forward, as the case may be. In this manner, the material is dropped into the trailer without raising a cloud of dust in and about the trailer, and substantially even filling of the trailer is assured.

I claim:

1. In a harvester of the character described, a mill for comminuting material and for discharging under pressure, an extensible conduit connected to the mill discharge, a cyclone collector supporting the free end of the conduit, a track on which the cyclone collector is movably supported and means for supporting the track in elevated position with respect to the mill.

2. In a harvester of the character described, a portable mill having means for comminuting material and for discharging under pressure, a trailer attached to the mill, a frame supported with respect to the mill and having a track extending over the trailer, a cyclone collector movably supported on the track and an extensible conduit connecting the mill discharge and the cyclone collector.

3. In a harvester of the character described, a portable mill having means for comminuting material and for discharging under pressure, a trailer attached to the mill, a frame supported with respect to the mill and having a track extending over the trailer, a cyclone collector movably supported on the track, an extensible conduit connecting the mill discharge and the cyclone collector, and means operable from a remote point for moving the collector on the track.

4. In a harvester of the character described, a portable mill having means for comminuting material and for discharging under pressure, a trailer attached to the mill, a frame supported with respect to the mill and having a track extending over the trailer, a cyclone collector movably supported on the track, an extensible conduit connecting the mill discharge with the cyclone collector, and means operable from a remote point for moving the cyclone collector on the track, the track having a frame thereon with anti-friction bearings supporting an intermediate portion of the extensible conduit.

5. In a harvester of the character described, a portable mill having means for comminuting material and for discharging under pressure, a frame supported with respect to the mill and having a rigid elevated track mounted horizontally thereon, a carriage movable on the track, a cyclone dust collector supported in the carriage, and an extensible conduit connecting the mill and the dust collector and having one end supported by the latter.

6. In a harvester of the character described, a portable mill having means for comminuting material and for discharging under pressure, a frame supported with respect to the mill and having a rigid elevated track mounted horizontally thereon, a carriage movable on the track, a cyclone dust collector supported in the carriage, and an extensible conduit connecting the mill and the dust collector and having one end supported by the latter, the carriage having wheels riding on the under surfaces of the track to prevent tilting.

7. In a harvester of the character described, a portable mill having means for comminuting material and for discharging under pressure, a trailer attached to the mill so as to be drawn thereby, a track mounted over the trailer, a carriage movable on the track, a cyclone dust collector supported in the carriage and an extensible conduit connecting the mill and the dust collector and carried in part by the latter.

IRVEN T. MILLER.